UNITED STATES PATENT OFFICE.

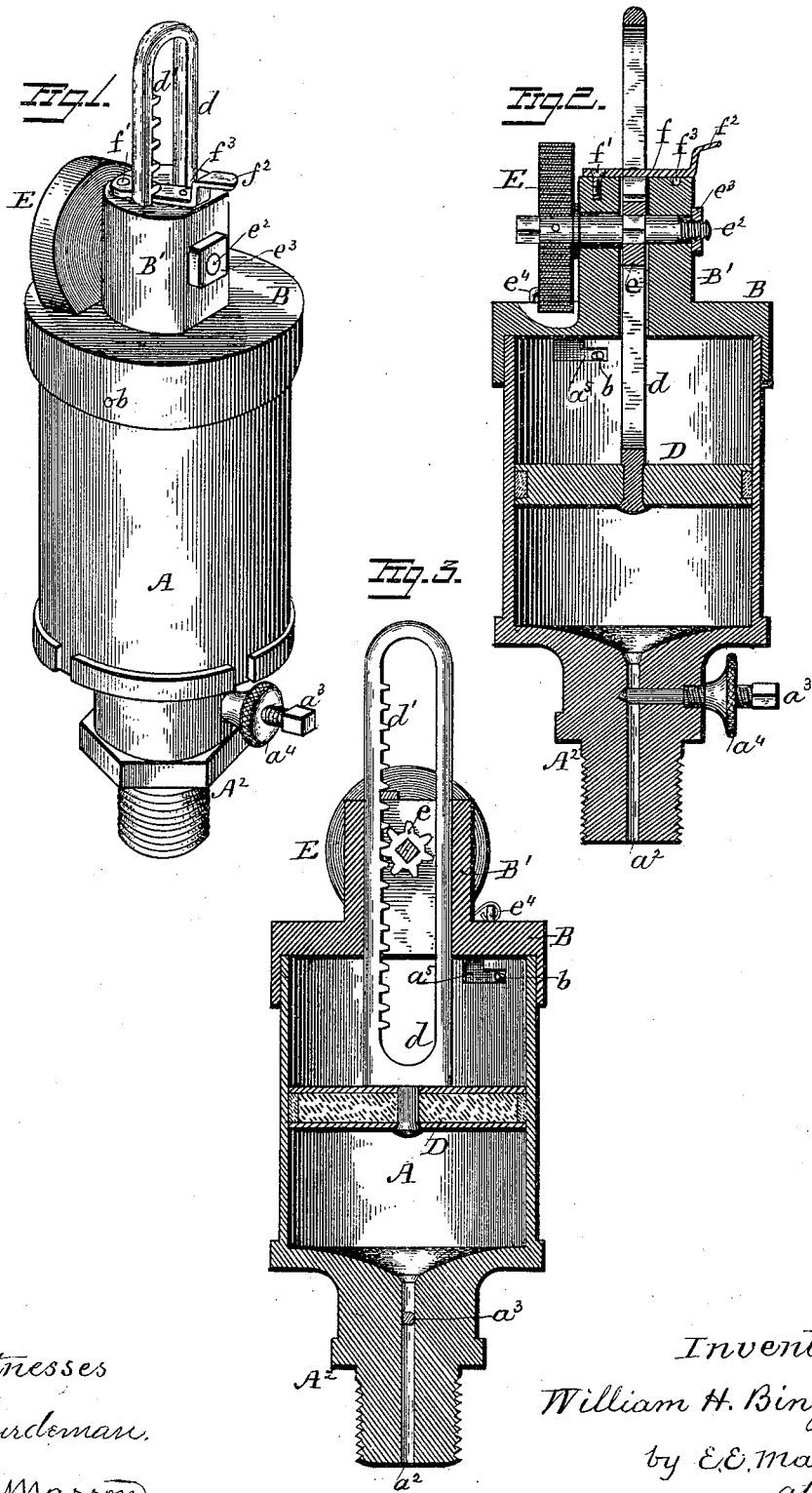

WILLIAM H. BINGHAM, OF ST. CLOUD, MINNESOTA.

LUBRICATOR.

SPECIFICATION forming part of Letters Patent No. 346,981, dated August 10, 1886.

Application filed March 20, 1886. Serial No. 195,925. (No model.)

*To all whom it may concern:*

Be it known that I, WILLIAM H. BINGHAM, a citizen of the United States, residing at St. Cloud, in the county of Stearns and State of Minnesota, have invented certain new and useful Improvements in Lubricators, of which the following is a specification, reference being had therein to the accompanying drawings.

My invention relates to improvements in that class of oil-cups which are adapted to be used for lubricating machinery with grease or other semi-fluid lubricant; and the objects of my improvements are to provide a device of simple construction for automatically and uniformly forcing the lubricant from the cups as the requirements of the machinery may demand, and permitting the removal of pressure from the lubricant, and its waste during any long stoppage of the machinery. I attain these objects by the construction illustrated in the acccompanying drawings, in which—

Figure 1 is a perspective view of the oil-cup constructed in accordance with my invention. Fig. 2 is a central vertical section of the same. Fig. 3 is a vertical section of the same, taken at right angles to the section shown in Fig. 2.

The oil-cup consists of a hollow cylindrical body, A, that may be made of glass, but is represented as made of metal, and provided with a screw-threaded stem, $A^2$, on its lower end, by which it can be attached to the part of a machine to be lubricated, and within said stem there is a vertical duct, $a^2$, for the issue of the lubricant. The amount of oil passing therethrough is regulated by the pointed pin $a^3$, the inner end of which enters the duct $a^2$. The body of this controlling-pin is screw-threaded, and engages with a horizontal perforation in the stem $A^2$. It also carries a jam-nut, $a^4$, to retain pin $a^3$ in whatever position it may be set, and its outer end is squared to receive a key by which it may be turned. The oil-cup is closed with a cover, B, fitting over it, the connection being preferably by means of a bayonet-joint—that is, by means of two or more pins, $b$, projecting inwardly from the cover and entering slots $a^5$ in the upper edge of the cup. The cover and its stem B' are centrally slotted for the passage of the piston-rod $d$ of the piston D, fitting in the interior of the cup. The piston-rod is preferably slotted, and is provided with a rack, $d'$, the teeth of which mesh with a pinion, $e$, secured upon a shaft, $e^2$, passing through the stem B' of the cover. This shaft is provided with a nut, $e^3$, at one end, and upon the other end is secured one extremity of a flat coiled spring, E, and said spring has its outer end secured to a staple, $e^4$, projecting from the top of the cover B. When a lubricant has been introduced into the cup and the spring E wound up, said lubricant is forced through the bottom duct by the piston, and its piston-rod actuated by the spring and the pinion $e$.

To remove the pressure off the lubricant while the machinery is stopped for a length of time, the piston is raised a short distance by its piston-rod, and the dog $f$ is thrust under one of the cogs of the rack $d'$. This dog is pivoted at one end, $f'$, upon the stem of the cover, and at the other end has a handle, $f^2$, to operate it, and adjacent to said handle it carries a pendent pin, $f^3$, adapted to enter one of the two holes made in the top of the stem B', for its reception either into engagement with the rack-teeth or out of engagement, as the case may be. The same key can be used to wind up the spring and to adjust the regulating-pin $a^3$.

Having now fully described my invention, I claim—

1. A lubricator consisting of a cup having a duct in its lower end, a piston in said cup, a rack secured to said piston, and a pinion meshing with said rack, in combination with a spring mounted upon the axle of said pinion, substantially as and for the purpose described.

2. The combination of a cup having a duct in the lower end thereof, and slots $a^5$ in the upper edge of said cup, and a pin, $a^3$, crossing said duct, with a cup-cover having internal pins, $b$, a piston within the cup, a piston-rod having rack-teeth, and a spring-controlled pinion meshing with said rack, substantially as and for the purpose described.

3. The combination of an oil-cup, its internal piston, and piston-rod having rack-teeth, with the cup-cover, the pinion meshing with said rack, and the pivoted dog $f$, adapted to engage with the rack-teeth, substantially as and for the purpose described.

In testimony whereof I affix my signature in presence of two witnesses.

WILLIAM H. BINGHAM.

Witnesses:
ANDREW C. ROBERTSON,
A. F. ROBERTSON.